US008684829B2

(12) United States Patent
Arnone et al.

(10) Patent No.: US 8,684,829 B2
(45) Date of Patent: Apr. 1, 2014

(54) SIDE BETTING FOR ENRICHED GAME PLAY ENVIRONMENT (SINGLE AND/OR MULTIPLAYER) FOR CASINO APPLICATIONS

(71) Applicant: Gamblit Gaming, LLC, Glendale, CA (US)

(72) Inventors: Miles Arnone, Sherborn, MA (US); Eric Meyerhofer, Pasadena, CA (US)

(73) Assignee: Gamblit Gaming, LLC, Glendale, CA (US)

( * ) Notice: Subject to any disclaimer, the term of this patent is extended or adjusted under 35 U.S.C. 154(b) by 0 days.

(21) Appl. No.: 13/896,783

(22) Filed: May 17, 2013

(65) Prior Publication Data

US 2013/0281192 A1 Oct. 24, 2013

Related U.S. Application Data

(63) Continuation of application No. PCT/US2012/049679, filed on Aug. 6, 2012.

(60) Provisional application No. 61/574,515, filed on Aug. 4, 2011.

(51) Int. Cl.
*A63F 13/00* (2006.01)

(52) U.S. Cl.
USPC .................................. 463/25; 463/16; 463/20

(58) Field of Classification Search
USPC ................................................ 463/16, 20, 25
See application file for complete search history.

(56) References Cited

U.S. PATENT DOCUMENTS

| | | | |
|---|---|---|---|
| 5,413,357 | A | 5/1995 | Schulze et al. |
| 5,718,429 | A | 2/1998 | Keller |
| 5,785,592 | A | 7/1998 | Jacobsen |
| 6,050,895 | A | 4/2000 | Luciano |

(Continued)

FOREIGN PATENT DOCUMENTS

| | | |
|---|---|---|
| JP | 2001300098 A | 10/2001 |
| JP | 2003111980 A | 4/2003 |

(Continued)

OTHER PUBLICATIONS itl.nist.gov, Extreme Studentized Deviate Test, [online], Sep. 2010, Internet<URL:http://www.itl.nistgov/div898/software/dataplot/refman1/auxillar/esd.htm>, entire document, National Institute of Standards and Technology (NIST), U.S. Department of Commerce.

(Continued)

*Primary Examiner* — James S McClellan
(74) *Attorney, Agent, or Firm* — Frank Cire

(57) ABSTRACT

Methods and systems for making a side bet in a hybrid game having a gambling game portion and an entertainment game portion are provided. The side bet is made in regards to the play of the entertainment portion of the hybrid game and can be made using a real world credit, a game world credit or a game world element. If the side bet is made using a real world credit, the real world credits used by the gambling game portion of the hybrid game and credited to a player are incremented or decremented. If the side bet is made using a game world element, the entertainment game portion of the hybrid game is updated based on the outcome of the side bet.

12 Claims, 4 Drawing Sheets

(56) References Cited

U.S. PATENT DOCUMENTS

| | | | |
|---|---|---|---|
| 6,227,974 | B1 | 5/2001 | Eilat |
| 6,267,669 | B1 | 7/2001 | Luciano |
| 6,712,693 | B1 | 3/2004 | Hettinger |
| 6,761,632 | B2 | 7/2004 | Bansemer et al. |
| 6,761,633 | B2 | 7/2004 | Riendeau |
| 6,764,397 | B1 | 7/2004 | Robb |
| 6,811,482 | B2 | 11/2004 | Letovsky |
| 7,118,105 | B2 | 10/2006 | Benevento |
| 7,294,058 | B1 | 11/2007 | Slomiany |
| 7,326,115 | B2 | 2/2008 | Baerlocher |
| 7,361,091 | B2 | 4/2008 | Letovsky |
| 7,517,282 | B1 | 4/2009 | Pryor |
| 7,575,517 | B2 | 8/2009 | Parham et al. |
| 7,682,239 | B2 | 3/2010 | Friedman et al. |
| 7,720,733 | B2 | 5/2010 | Jung et al. |
| 7,753,770 | B2 | 7/2010 | Walker et al. |
| 7,753,790 | B2 | 7/2010 | Nguyen |
| 7,775,885 | B2 | 8/2010 | Van Luchene |
| 7,798,896 | B2 | 9/2010 | Katz |
| 7,828,657 | B2 | 11/2010 | Booth |
| 7,917,371 | B2 | 3/2011 | Jung et al. |
| 7,938,727 | B1 | 5/2011 | Konkle |
| 7,967,674 | B2 | 6/2011 | Baerlocher |
| 7,980,948 | B2 | 7/2011 | Rowe |
| 7,996,264 | B2 | 8/2011 | Kusumoto et al. |
| 8,012,023 | B2 | 9/2011 | Gates |
| 8,047,915 | B2 | 11/2011 | Lyle |
| 8,060,829 | B2 | 11/2011 | Jung et al. |
| 8,075,383 | B2 | 12/2011 | Friedman et al. |
| 8,087,999 | B2 | 1/2012 | Oberberger |
| 8,113,938 | B2 | 2/2012 | Friedman et al. |
| 8,118,654 | B1 | 2/2012 | Nicolas |
| 8,128,487 | B2 | 3/2012 | Hamilton et al. |
| 8,135,648 | B2 | 3/2012 | Oram |
| 8,137,193 | B1 | 3/2012 | Kelly et al. |
| 8,157,653 | B2 | 4/2012 | Buhr |
| 8,167,699 | B2 | 5/2012 | Inamura |
| 8,177,628 | B2 | 5/2012 | Manning |
| 8,182,338 | B2 | 5/2012 | Thomas |
| 8,182,339 | B2 | 5/2012 | Anderson |
| 8,187,068 | B2 | 5/2012 | Slomiany |
| 8,206,210 | B2 | 6/2012 | Walker |
| 2001/0004609 | A1 | 6/2001 | Walker et al. |
| 2001/0019965 | A1 | 9/2001 | Ochi |
| 2002/0022509 | A1 | 2/2002 | Nicastro |
| 2002/0090990 | A1 | 7/2002 | Joshi et al. |
| 2002/0175471 | A1 | 11/2002 | Faith |
| 2003/0060286 | A1 | 3/2003 | Walker et al. |
| 2003/0119576 | A1 | 6/2003 | McClintic et al. |
| 2003/0139214 | A1 | 7/2003 | Wolf et al. |
| 2003/0171149 | A1 | 9/2003 | Rothschild |
| 2004/0092313 | A1 | 5/2004 | Saito et al. |
| 2004/0102238 | A1 | 5/2004 | Taylor |
| 2004/0121839 | A1 | 6/2004 | Webb |
| 2004/0225387 | A1 | 11/2004 | Smith |
| 2005/0003878 | A1 | 1/2005 | Updike |
| 2005/0096124 | A1 | 5/2005 | Stronach |
| 2005/0116411 | A1 | 6/2005 | Herrmann et al. |
| 2005/0192087 | A1 | 9/2005 | Friedman et al. |
| 2005/0233791 | A1 | 10/2005 | Kane |
| 2005/0239538 | A1 | 10/2005 | Dixon |
| 2005/0269778 | A1 | 12/2005 | Samberg |
| 2005/0288101 | A1 | 12/2005 | Lockton et al. |
| 2006/0003823 | A1 | 1/2006 | Zhang |
| 2006/0003830 | A1 | 1/2006 | Walker et al. |
| 2006/0040735 | A1 | 2/2006 | Baerlocher |
| 2006/0068913 | A1 | 3/2006 | Walker et al. |
| 2006/0084499 | A1 | 4/2006 | Moshal |
| 2006/0084505 | A1 | 4/2006 | Yoseloff |
| 2006/0135250 | A1 | 6/2006 | Rossides |
| 2006/0154710 | A1 | 7/2006 | Serafat |
| 2006/0166729 | A1 | 7/2006 | Saffari et al. |
| 2006/0189371 | A1 | 8/2006 | Walker et al. |
| 2006/0234791 | A1 | 10/2006 | Nguyen et al. |
| 2006/0258433 | A1 | 11/2006 | Finocchio et al. |
| 2007/0035548 | A1 | 2/2007 | Jung et al. |
| 2007/0038559 | A1 | 2/2007 | Jung et al. |
| 2007/0064074 | A1 | 3/2007 | Silverbrook et al. |
| 2007/0087799 | A1 | 4/2007 | Van Luchene |
| 2007/0093299 | A1 | 4/2007 | Bergeron |
| 2007/0117641 | A1 | 5/2007 | Walker et al. |
| 2007/0129149 | A1 | 6/2007 | Walker |
| 2007/0156509 | A1 | 7/2007 | Jung et al. |
| 2007/0167212 | A1 | 7/2007 | Nguyen |
| 2007/0167239 | A1 | 7/2007 | O'Rourke |
| 2007/0191104 | A1 | 8/2007 | Van Luchene |
| 2007/0203828 | A1 | 8/2007 | Jung et al. |
| 2007/0293306 | A1 | 12/2007 | Nee et al. |
| 2008/0004107 | A1 | 1/2008 | Nguyen et al. |
| 2008/0014835 | A1 | 1/2008 | Weston et al. |
| 2008/0015004 | A1 | 1/2008 | Gatto et al. |
| 2008/0070659 | A1 | 3/2008 | Naicker |
| 2008/0070690 | A1 | 3/2008 | Van Luchene |
| 2008/0070702 | A1 | 3/2008 | Kaminkow |
| 2008/0096665 | A1 | 4/2008 | Cohen |
| 2008/0108425 | A1 | 5/2008 | Oberberger |
| 2008/0119283 | A1 | 5/2008 | Baerlocher |
| 2008/0146308 | A1 | 6/2008 | Okada |
| 2008/0146344 | A1 * | 6/2008 | Rowe et al. .................... 463/42 |
| 2008/0176619 | A1 | 7/2008 | Kelly |
| 2008/0191418 | A1 | 8/2008 | Lutnick et al. |
| 2008/0195481 | A1 | 8/2008 | Lutnick |
| 2008/0248850 | A1 | 10/2008 | Schugar |
| 2008/0254893 | A1 | 10/2008 | Patel |
| 2008/0274798 | A1 | 11/2008 | Walker et al. |
| 2008/0311980 | A1 | 12/2008 | Cannon |
| 2008/0318668 | A1 | 12/2008 | Ching |
| 2009/0011827 | A1 | 1/2009 | Englman |
| 2009/0023489 | A1 | 1/2009 | Toneguzzo |
| 2009/0023492 | A1 | 1/2009 | Erfanian |
| 2009/0061974 | A1 | 3/2009 | Lutnick et al. |
| 2009/0082093 | A1 | 3/2009 | Okada |
| 2009/0098934 | A1 | 4/2009 | Amour |
| 2009/0118006 | A1 | 5/2009 | Kelly et al. |
| 2009/0124344 | A1 | 5/2009 | Mitchell et al. |
| 2009/0131158 | A1 | 5/2009 | Brunet De Courssou et al. |
| 2009/0131175 | A1 | 5/2009 | Kelly et al. |
| 2009/0143141 | A1 | 6/2009 | Wells |
| 2009/0149233 | A1 | 6/2009 | Strause et al. |
| 2009/0176560 | A1 | 7/2009 | Herrmann et al. |
| 2009/0176566 | A1 | 7/2009 | Kelly |
| 2009/0221355 | A1 | 9/2009 | Dunaevsky et al. |
| 2009/0247272 | A1 | 10/2009 | Abe |
| 2009/0291755 | A1 | 11/2009 | Walker et al. |
| 2009/0309305 | A1 | 12/2009 | May |
| 2009/0312093 | A1 | 12/2009 | Walker et al. |
| 2009/0325686 | A1 | 12/2009 | Davis et al. |
| 2010/0004058 | A1 | 1/2010 | Acres |
| 2010/0016056 | A1 | 1/2010 | Thomas et al. |
| 2010/0035674 | A1 | 2/2010 | Slomiany |
| 2010/0056247 | A1 | 3/2010 | Nicely |
| 2010/0062836 | A1 | 3/2010 | Young |
| 2010/0093420 | A1 | 4/2010 | Wright |
| 2010/0120525 | A1 | 5/2010 | Baerlocher et al. |
| 2010/0124983 | A1 | 5/2010 | Gowin et al. |
| 2010/0137047 | A1 | 6/2010 | Englman et al. |
| 2010/0174593 | A1 | 7/2010 | Cao |
| 2010/0203940 | A1 | 8/2010 | Alderucci et al. |
| 2010/0210344 | A1 | 8/2010 | Edidin et al. |
| 2010/0227672 | A1 | 9/2010 | Amour |
| 2010/0227688 | A1 | 9/2010 | Lee |
| 2010/0240436 | A1 | 9/2010 | Wilson et al. |
| 2010/0304839 | A1 | 12/2010 | Johnson |
| 2010/0304842 | A1 | 12/2010 | Friedman et al. |
| 2011/0009177 | A1 | 1/2011 | Katz |
| 2011/0009178 | A1 | 1/2011 | Gergon |
| 2011/0045896 | A1 | 2/2011 | Sak et al. |
| 2011/0077087 | A1 | 3/2011 | Walker et al. |
| 2011/0082571 | A1 | 4/2011 | Murdock et al. |
| 2011/0109454 | A1 | 5/2011 | McSheffrey et al. |
| 2011/0111837 | A1 | 5/2011 | Gagner |
| 2011/0118011 | A1 | 5/2011 | Filipour et al. |
| 2011/0207523 | A1 | 8/2011 | Filipour et al. |
| 2011/0212766 | A1 | 9/2011 | Bowers |

(56) References Cited

U.S. PATENT DOCUMENTS

| | | | |
|---|---|---|---|
| 2011/0212767 | A1 | 9/2011 | Barclay |
| 2011/0218028 | A1 | 9/2011 | Acres |
| 2011/0218035 | A1 | 9/2011 | Thomas |
| 2011/0230258 | A1 | 9/2011 | Van Luchene |
| 2011/0230260 | A1 | 9/2011 | Morrow et al. |
| 2011/0244944 | A1 | 10/2011 | Baerlocher |
| 2011/0263312 | A1 | 10/2011 | De Waal |
| 2011/0269522 | A1 | 11/2011 | Nicely et al. |
| 2011/0275440 | A1 | 11/2011 | Faktor |
| 2011/0287828 | A1 | 11/2011 | Anderson et al. |
| 2011/0287841 | A1 | 11/2011 | Watanabe |
| 2011/0312408 | A1 | 12/2011 | Okuaki |
| 2012/0058814 | A1 | 3/2012 | Lutnick |
| 2012/0077569 | A1 | 3/2012 | Watkins |
| 2012/0108323 | A1 | 5/2012 | Kelly |
| 2012/0202587 | A1 | 8/2012 | Allen et al. |
| 2012/0322545 | A1 | 12/2012 | Arnone et al. |

FOREIGN PATENT DOCUMENTS

| | | | |
|---|---|---|---|
| JP | 2004097610 | A | 4/2004 |
| JP | 2004166746 | A | 6/2004 |
| WO | 9851384 | A1 | 11/1998 |
| WO | 2010087090 | A1 | 8/2010 |
| WO | 2011109454 | A1 | 9/2011 |
| WO | 2012078668 | A1 | 6/2012 |
| WO | 2012139083 | A1 | 10/2012 |
| WO | 2012167146 | A1 | 12/2012 |
| WO | 2012167275 | A2 | 12/2012 |
| WO | 2013009972 | A1 | 1/2013 |
| WO | 2013010036 | A1 | 1/2013 |
| WO | 2013012956 | A1 | 1/2013 |

OTHER PUBLICATIONS

Changing the Virtual Self: Avatar Transformations in Popular Games; Barr et al., Victoria Univ., NZ, 2006.

Real-Time Multimodal Human-Avatar Interaction; Li et al., IEEE (Video Technology) vol. 18, No. 4, 2008.

International Search Report and Written Opinion, PCT/US2012/49679, Oct. 22, 2012.

* cited by examiner

SIDE BETTING FOR ENRICHED GAME PLAY ENVIRONMENT (SINGLE AND/OR MULTIPLAYER) FOR CASINO APPLICATIONS

CROSS REFERENCE TO RELATED APPLICATIONS

This application is a continuation of Patent Cooperation Treaty Application No. PCT/US12/49679, filed Aug. 6, 2012, which claims the benefit of U.S. Provisional Application No. 61/574,515, filed Aug. 4, 2011, the contents of each of which are hereby incorporated by reference as if stated in full herein.

FIELD

The present disclosure is generally related to gaming and more specifically to methods and systems for making a side bet in a hybrid game having a gambling game portion and an entertainment game portion.

BACKGROUND

Various embodiments of the present invention relate generally to a game of chance and more specifically to the methods and apparatus necessary to create and operate the hardware and software constituent components in the context of a game of chance environment.

Background

The gaming machine manufacturing industry provides a variety of gaming machines for the amusement of gambling players. An exemplary gaming machine is a slot machine. A slot machine is an electro-mechanical game wherein a random number generator determines the outcome of a gambling game, and this, coupled with the betting decisions of a player, results in a specific payout. Slot machines are usually found in casinos or other more informal gaming establishments. The subject invention is a form of slot machine, designed for use in a physical or virtual casino environment, which provides players an environment in which to play for cash, either against the casino and/or each other in a regulated manner, in a fashion mimicking video entertainment games which are popular today (such as those executing on a PlayStation® or Xbox® and including multi-player and massively multi-player games played over the internet).

SUMMARY

In one embodiment, a method of processing a side bet in a hybrid game having an entertainment game portion and a gambling game portion is provided. The method comprises accepting by the hybrid game, real world credits wagered in the gambling game portion of the hybrid game, presenting a proposal of a real world credit side bet regarding the entertainment game portion of the hybrid game, monitoring a playing of the entertainment game portion of the hybrid game, triggering a real world credit wager in the gambling game portion of the hybrid game based on the monitoring of the playing of the entertainment game portion of the hybrid game, determining a real world credit outcome of the real world credit side bet based on the monitoring of the playing of the entertainment game portion of the hybrid game; determining a real world credit outcome of the real world credit wager by executing the real world credit wager in the gambling game portion of the hybrid game, making a payout of an amount of the real world credits wagered in the gambling game portion of the hybrid game based on the real world credit outcome of the side bet regarding the entertainment game portion of the hybrid game and the real world credit outcome of the wager in the gambling game portion of the hybrid game; and updating the entertainment game based on the outcome of the side bet.

In some embodiments, the side bet is between a player of the hybrid game and the hybrid game.

In many embodiments, the side bet is between two players of the hybrid game.

In various embodiments, the side bet is between to observers of the playing of the hybrid game.

In numerous embodiments, a data processing apparatus for a hybrid game including processing a side bet in a hybrid game having an entertainment game portion and a gambling game portion is provided. The apparatus comprises a processor, a memory coupled to the processor, the memory having processor-executable instructions stored thereon, the processor-executable instructions comprising, accepting by the hybrid game, real world credits wagered in the gambling game portion of the hybrid game, presenting a proposal of a real world credit side bet regarding the entertainment game portion of the hybrid game, monitoring a playing of the entertainment game portion of the hybrid game, triggering a real world credit wager in the gambling game portion of the hybrid game based on the monitoring of the playing of the entertainment game portion of the hybrid game, determining a real world credit outcome of the real world credit side bet based on the monitoring of the playing of the entertainment game portion of the hybrid game, determining a real world credit outcome of the real world credit wager by executing the real world credit wager in the gambling game portion of the hybrid game, making a payout of an amount of the real world credits wagered in the gambling game portion of the hybrid game based on the real world credit outcome of the side bet regarding the entertainment game portion of the hybrid game and the real world credit outcome of the wager in the gambling game portion of the hybrid game, and updating the entertainment game based on the outcome of the side bet.

In some embodiments, a processor-readable storage medium storing processor-executable instructions for a method of processing a side bet in a hybrid game having an entertainment game portion and a gambling game portion is provided. The instructions comprise accepting by the hybrid game, real world credits wagered in the gambling game portion of the hybrid game, presenting a proposal of a real world credit side bet regarding the entertainment game portion of the hybrid game, monitoring a playing of the entertainment game portion of the hybrid game, triggering a real world credit wager in the gambling game portion of the hybrid game based on the monitoring of the playing of the entertainment game portion of the hybrid game, determining a real world credit outcome of the real world credit side bet based on the monitoring of the playing of the entertainment game portion of the hybrid game, determining a real world credit outcome of the real world credit wager by executing the real world credit wager in the gambling game portion of the hybrid game, making a payout of an amount of the real world credits wagered in the gambling game portion of the hybrid game based on the real world credit outcome of the side bet regarding the entertainment game portion of the hybrid game and the real world credit outcome of the wager in the gambling game portion of the hybrid game, and updating the entertainment game based on the outcome of the side bet.

DETAILED DESCRIPTION

Figure 1:
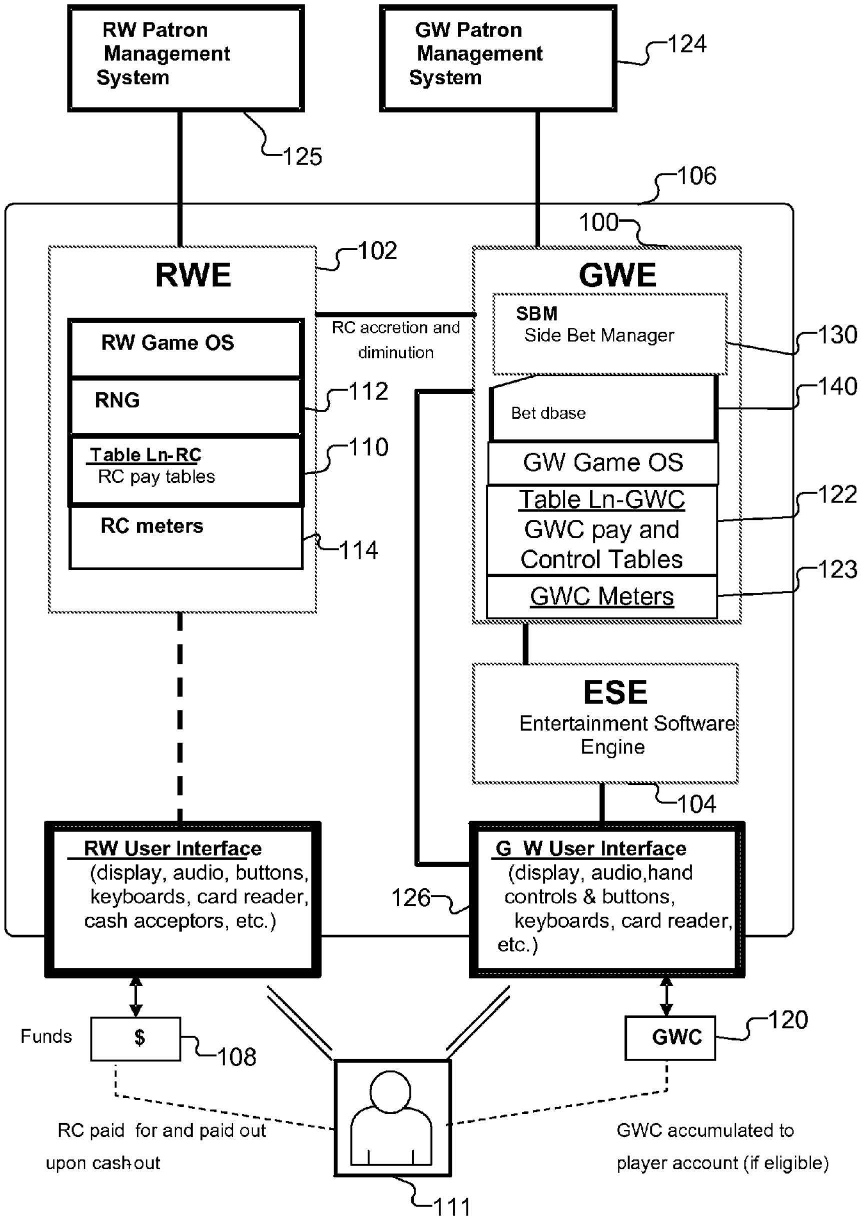
FIG. 1 is an a diagram of a system in accordance with an exemplary embodiment of a hybrid game having a side betting module.

Methods and systems for a game of a chance, influenced by components of the player's skill, allowing a player to compete directly with a gaming machine device are provided. The methods and systems provide players a rich (i.e. akin to leading home- and arcade-based video games) single-player, multi-player cooperative and/or head to head environment in which the participant(s) win cash and credits as a result of their play activity within the environment, based on the wagers which they make entering and playing the game FIG. 1 generally illustrates the architecture of the system and the interaction between three systems: a game world engine (GWE) 100, a real world engine (RWE) 102 and an entertainment software engine (ESE) 104, the electrical and software system which controls the playing of video games. The combination of an RWE, a GWE and an ESE are included in a hybrid game 106.

In many embodiments, a game world (GW) includes an entertainment game portion of a hybrid game and includes the information typically associated with a virtual interactive entertainment environment, including its game characters, progress points and scores. For example, a typical game played on a Sony PlayStation® console could be thought of as being included in a GW.

A real world (RW) portion of a hybrid game is a gambling game portion, which may or may not include an entertainment portion of its own, but whose operation is enabled by real funds, accretes and declinates real gambling credits based on random gambling outcomes, and whose gambling proposition is typically regulated by gaming control bodies. For example, the fundamentals of the mechanisms of play of a slot machine could be thought of as included in a RW.

In some embodiments, real world credit (RC) 108 are credits that are analogous to slot machine game credits which are entered into a RW game by the user, either in the form of cash or electronic funds. In many embodiments, RCs are decremented or augmented based on the outcome of a random number generator according to a Table Ln-Rc 110 real world credits pay table, independently of player skill. In numerous embodiments, a certain amount of RC are required to enter higher ESE 104 game levels. In some embodiments, RC can be carried forward to higher game levels or paid out if a game cash out is opted for by a player 111. The amount of RC required to enter a specific level of the game "Level n" need not be the same for each level.

A level n real-world credit pay table (Table Ln-Rc) 110 is a table used in conjunction with a random number generator (RNG) 112 to dictate the RC earned as a function of game play and is analogous to the pay tables used in a conventional slot machine. In many embodiments, Table Ln-Rc payouts are independent of player skill. There may be one or a plurality of Table Ln-Rc pay tables included in a game design, the selection of which being determined by game progress a player has earned, and bonus rounds which a player may be eligible for.

The RWE 102 is the operating system for the RW portion of the game and controls and operates the gambling proposition. The RWE is a portion of a hybrid game which manages the RW portion of the game and includes the mechanical, electronic and software components to: (a) provide control of the RW portion of the game, (b) include Table Ln-RC and to take input from this table to affect the play of the RW portion of the game, (c) couple to the GWE to communicate the amount of RC available on the game, (d) communicate other metrics of wagering to the GWE, (e) accept input from the GWE as to the amount of RC in play, (f) accept signaling from the GWE in order to trigger the actual execution of an RW gambling play, (g) include various audit logs and activity meters, (h) couple to a centralized server for exchanging various data related to accounting of the gambling proposition, the player and their wagering activities on the game.

The RWE includes an RNG 112 which is a software and/or hardware algorithm and/or process which is used to generate random outcomes, pay tables (Table Ln-RC) 110, meters 114 and other software constructs used by the game of chance to offer a fair and transparent gaming proposition, and to include the auditable systems and functions necessary for the game to obtain gaming regulatory body approval. The RWE encompasses many components of a slot machine. A slot machine is typically an electro-mechanical game wherein a random number generator determines the chance of outcome of a game, and coupled with the betting decisions of a player, a gambling outcome result. Slot machines are usually found in casinos or other more informal gaming establishments.

In some embodiments, the RWE 102 does not include an entertainment front end. The RWE accepts a trigger to run the gambling proposition in response to actions taken by the player in the GW as conveyed by the ESE 104 to the GWE 100, or as triggered by the GWE based on its algorithms, background to the overall game from the player's perspective, but would provide information to the GWE to expose the player to certain aspects of the gaming proposition, such as odds, amount of RC in play, amount of RC available, etc. In some embodiments, an RWE accepts modifications in the amount of RC wagered on each individual gambling try, or the number of games per minute the RWE would execute, entrance into a bonus round, and other factors, all the while these factors and the choices from the player's perspective taking a different form than that of a typical slot machine. An example of a varying wager amount that the player would choose might be that they have decided to play with a more powerful character in the game, or having a more powerful gun, a better car, etc. These choices would increase or decrease the amount wagered per individual RWE gambling game, in the same manner that a standard slot machine player may decide to wager more or less credits for each pull of the handle. The RWE would communicate a number of factors back and forth to the GWE, discussed below, via their interface, such increase/decrease in wager being a function of the player's decision making as to their operational profile in the GW (i.e. power of the character, gun selection, car choice, etc.). In this manner, the player is always in control of the per game wager amount, with the choice mapping to some parameter or component which is applicable to the GW experience that is the entertainment piece for the game. An example of the RWE operation are a game of chance running, say every 10 seconds, the amount wagered being communicated from the GWE as a function of choices the player makes in the operation profile in the GW such as those cited above.

Game world credits (GWCs) are player points earned or depleted as a function of player skill, i.e. as a function of player performance in the context of the game. In many embodiments, GWC is analogous to the "score" in a typical video game. Each game has a scoring criterion, embedded within a Table Ln-GWC 122 that reflects player performance against the goal(s) of the game. In numerous embodiments, GWC can be carried forward from one level of game play to another, and ultimately paid out in various manners such as directly in cash, or indirectly such as earning entrance into a sweepstakes drawing, or earning participation in, or victory in, a tournament with prizes. In some embodiments, GWC may be stored on a player tracking card or in a network-based player tracking system and the GWC is attributed to a specific player.

A level n game world credit pay table (Table Ln-GWC) 122 is a table that determines the GWC earned as a function of player skill in the nth level of the game. The payouts governed by this table are dependent upon player skill and game play at large and may or may not be coupled to a random number generator.

In some embodiments, GWC determines levels in a game. In numerous embodiments, any player may begin game play at level 1. Entry to level 1 requires loading of RC into the game. There is no GWC required to enter level 1. Players can re-enter the game at level 'n' if they have accumulated adequate GWC to enter the level. A specific GWC hurdle is established for each Level, with GWC≥0 allowing entry into level 1. The GWC hurdle for each level n may be the same or can increase as a function of each level. In some embodiments, when a certain level of GWC is obtained by the player, game play proceeds to a non-re-entrant level Level B1 commences a series of levels from B1 to Bn where re-entry is no-longer possible and where game play may be exclusively skill based or a combination of skill and chance. In many embodiments, game-play continues as the player advances through the B levels until such time as the player either cashes out their RC, all RC has been consumed, a player has exhausted their GWC through play, or a player has exhausted their game character's lives, energy or other necessary element required for the character to survive within the game environment. In some embodiments, a player cashing out in the B levels can re-enter the game at the highest re-entrant level, "level n". In some embodiments, there are additional levels are non-re-entrant levels that are only accessed by completing a level B(n−1) with adequate GWC.

In some embodiments, an enabling element (EE) is a GW element that is consumed or accumulated in the context of the game, such as ammo, health points, potions, fuel, etc. In numerous embodiments, currency includes EE, GWC, RC, other entertainment game elements.

FIG. 1 also includes the GWE 100, the gaming world operating system. The GWE is a portion of the hybrid game which primarily manages the GW portion of the game and includes the mechanical, electronic and software components to: (a) provide control of the GW portion of the game, (b) include Table Ln-GWC 122 and to take input from this table to affect the play of the GW portion of the game, (c) couple to the RWE 102 to determine the amount of RC available on the game and other metrics of wagering on the RW portion of the game, and potentially affect the amount of RC in play on the RWE, (d) include various audit logs and activity meters 123, (e) couple to a centralized server 124 for exchanging various data related to the player and their activities on the game, (f) couple to the ESE 104.

One of the GWE's 100 functions is to manage the overall game operation, with the RWE 102 and the ESE 104 effectively being support units to the GWE. In some embodiments, no operation of the GWE affects the RWE's gambling operation except for player choice parameters that are allowable in slot machines today, such as the wager amount, how fast the player wants to play (by pressing a button or pulling the slot's handle), agreement to wager into a bonus round, etc. In this sense, the RWE provides a fair and transparent, non-skill based gambling proposition co-processor to the GWE. The communication link shown between the GWE and the RWE in FIG. 1 is primarily for the purposes of GWE obtaining information from the RWE as to the amount of RC available on the RW portion of the game, and necessary status operation of the RWE (such as on-line or tilt), and for the GWE to communicate to the RWE the various gambling control factors which the RWE uses as input, such as the number of RC consumed per game or the player's election to enter a jackpot round.

In some embodiments, the GWE 100 connects to the player's user interface 126 directly, as this may be necessary to communicate certain GW club points, player status, control the selection of choices and messages which a player may require in order to adjust their GW experience or understand their gambling status in the RWE 102.

In FIG. 1, the GWE 100 also connects to the ESE 104. The ESE manages and controls the visual, audio and player control entertainment for the GW game. In many embodiments, the ESE accepts input from a player through a set of hand controls and outputs video, audio and/or other sensory output to a user interface. A PC, Sony PlayStation® or Microsoft Xbox® running a specific game program (e.g. a version of Madden Football '10) are typical examples of an ESE. The ESE exchanges data with and accepts control information from the GWE.

The ESE 104 operates mostly independently from the GWE 100, except that via their interface, the GWE may send certain GW game control parameters to the ESE to affect its play, such as what level of character to be using, changing the difficulty level of the game, changing the type of gun or car in use, requesting potions to become available or to be found by the character, etc. The ESE accepts this input from the GWE, makes adjustments, and continues the play action all the while running seamlessly from the player's perspective. The ESE's operation is mostly skill based, except for where the ESE's algorithm may inject complexities into the game by chance in its normal operation to create unpredictability in the GW game and the like. Utilizing this interface, the ESE may also communicate player choices made in the game to the GWE, such as selection of a different gun, the player picking up a special potion in the GW environment, etc. The GWE's job in this architecture, being interfaced thusly to the ESE, is to allow the transparent coupling of entertainment software to a fair and transparent random chance gambling game, providing a seamless perspective to the player that they are playing a typical popular entertainment and skill based game. For example, the ESE in this application could be used to enable a wide range of games including popular titles from arcade and home video games (e.g. Gears of War, Time Crisis, Madden Football, etc.). Providers of such software would provide the previously described interface by which the GWE could request amendments to the operation of the ESE software, in order to provide the seamless and sensible operation of the invention as both a RW gambling and entertainment machine.

Various hybrid games are discussed in Patent Cooperation Treaty Application No. PCT/US11/26768, filed Mar. 1, 2011, entitled "ENRICHED GAME PLAY ENVIRONMENT (SINGLE and/or MULTI-PLAYER) FOR CASINO APPLICATIONS" and Patent Cooperation Treaty Application No. PCT/US11/63587, filed Dec. 6, 2011, entitled "ENHANCED SLOT-MACHINE FOR CASINO APPLICATIONS" each disclosure of which is hereby incorporated by reference in its entirety.

In numerous embodiments, a video game style gambling machine is implemented, where the gambling portion of the game (i.e. RWE 102 and RC 108) is not player skill based, while at the same time allows players to use their skills to earn club points which an operator of a casino, such as an operator of a gaming establishment in either one or a plurality of locations where people go to play a gambling games of chance whether online or land-based, can translate to rewards, tournaments opportunities and prizes for the players. The actual exchange of monetary funds earned or lost directly from gambling against a slot machine is preserved, while at the same time a rich environment of rewards to stimulate "gamers" can be established. In some embodiments, a casino operator may operate other gambling operations, including but not limited to a wide area network gaming franchise, a gaming route, or other gambling business be it a physical manifestation in the case of a casino or virtual in the case of an internet gambling operation.

In numerous embodiments, a hybrid game leverages very popular titles with "gamers" and provides a sea change environment for casinos to attract players with games that are more akin to the type of entertainment which a younger generation desires.

In many embodiments, players use their skill towards building and banking GWC which in turn could be used to win tournaments and various prizes as a function of their "gamers" prowess.

In some embodiments, the underlying changes needed to the aforementioned entertainment software (Gears of War, etc.), are minimized for the entertainment game to operate within the gaming construct, thus making a plethora of complex game titles and environments, rapid and inexpensive to deploy in a gambling environment.

In numerous embodiments, a player playing a hybrid game or observers observing players playing the hybrid game may make a side bet. A side bet is a wager placed by a player of a hybrid game in the context of the outcome of interactive game play, where the bet relates either to the outcome of game play, an intermediary event within interactive game play, or both. Side bets can be, for example, made by a player in response to a prompt by the hybrid game, at the initiation of the player, between a single player and the hybrid game, or between players involved in a multi-player game or playing distinct instances of the same game title. This list is exemplary and not meant to be exhaustive.

In numerous embodiments, a side bet module (SBM) 130 within the hybrid game manages the presentation, placement and execution of side bets and any lottery bets made during game play. In some embodiments, the SBM can operate within the context of a single hybrid game, but can also interface with SBMs across multiple hybrid games to enable players to place side bets against one another in head-to-head and non-head-to-head situations.

In various embodiments, a global betting manager (GBM) (not shown) coordinates bets that are made across multiple hybrid games by multiple players. In some implementations it can also support betting by 3$^{rd}$ parties relative to the in-game performance of other players. The GBM can stand alone, or is capable of being embedded in one of a number of systems, including patron management systems, a game world credit exchange (GWCE) system, or can operate independently on one or a number of servers on-site at a casino, as part of a larger network and/or the internet or "cloud" in general. The GBM also supports the management of lottery tickets issued as a function of game play, as submitted to the GBM by the SBM.

In many embodiments, players are allowed to make side bets on the outcome of events within the entertainment game, or within the gambling game. Side bets can be made on a head-to-head basis between players competing in the context of a single game, between players playing the same game title, but not in a head-to-head situation, or in non-head-to-head situations, as when a single player is competing against a computer.

The management of side bets is achieved through the SBM 130 within the GWE 100 or hybrid game 106. The SBM communicates with the GWE (if appropriate), ESE 104, RWE 102, and patron management systems 124 and 125 as necessary to place the bet, accurately record the outcome and affect the payout as may be necessary. In some embodiments, in cases where bets are made between players across more than one hybrid game, the SBM from the originating party (i.e. the hybrid game associated with the player initiating the bet proposition to the other player or players) initiates communication with SBMs of other hybrid games to manage the flow of currency bet and to record the outcome. This process involves ensuring that currency committed to the side bet by each party is deducted at each local hybrid game until the bet is concluded, registering the result of the side bet, and distributing currency accordingly to players and/or the casino. In another embodiment of the invention, the management of funds associated with bets made and coordination of all such side-bet propositions is controlled by the GBM (not shown) in coordination with one or more SBMs within each hybrid game. As such, the side bet mechanism can be a peer-to-peer (i.e. SBM to SBM) system or a server-client type approach (i.e. GBM coordinating with one or more SBMs).

In some embodiments, the opportunity for a side bet is presented to the player via the player's character or a controlled entity (such as a non-player character that is controlled or associated with the player) in the context of the entertainment game through the hybrid game's user interface, and provides the opportunity for the player to accept or decline the side bet, to select the amount of currency to commit to the side bet, and also informs the player as to the odds of the bet, if applicable. An example of this is a player's character seeking out the local bookie in the GW town that the character might be traveling around, and negotiating the bet with this fictitious bookie.

In many embodiments, the player can initiate the placement of a side bet through a button push or by selecting an icon on the display in a RW context, meaning not in a GW method as described above but in a mechanical way (e.g. a bet window opens, player pushes appropriate buttons to accept or decline). The opportunity for the player to initiate a side bet may or may not be available at all times during game play. In some embodiments, the opportunity to initiate a side bet is only available at the onset of game play. In another embodiment, the opportunity to initiate a side bet is available at various times throughout the game as a function of the state of the game. For example, before opening a door in an adventure game the player may be presented with the opportunity to press a button or click on an icon (now active) to select one of a number of applicable side bets. For example, one such side bet could address the question of how many monsters will be behind the door in question. Once the door is opened, the opportunity to place a side bet may be unavailable to the player until the room in question is cleared of its contents.

In embodiments where side bets may be placed during play of the entertainment game, the ESE 104 can trigger the availability of the bet by sending a code to the SBM 130 of the hybrid game 106. The SBM interprets this code to present the bet to the player, either directly as a function of the content of the code, or by cross-referencing the code to a pre-established database 140 or bet database of possible bets resident within the SBM.

In some embodiments, in a head-to-head situation, a player can invoke a side bet and challenge one or more other players to accept the side bet. The hybrid game 106 presents the opportunity for a player to invoke such a side bet through one of the hybrid game's display elements (e.g. screen, buttons, etc.) when appropriate in the context of the game. One or multiple potential side bet propositions are presented to the initiating player. Once the initiating player characterizes the bet to be offered to other players (either through selection of a discrete option, or through a more free-form construction process) and selects the players to whom the bet is to be offered, the SBM 130 communicates this information to the appropriate players' games. If one or more players (as applicable to the bet type and the number of players participating head-to-head) accept the bet, then the appropriate amount of currency being bet is deducted from each player. Game play commences (or continues if the side bet was made in the midst of game play), and upon completion of the criteria to bring the bet to closure, the appropriate currency payments are made to each player and/or the casino.

The aforementioned communication between each game's SBM 130 can be achieved through communication between hybrid games over a network, or may be achieved by virtue of a GBM (not shown). In this case, the span of the GBM (e.g. a bank of machines, a floor, a casino group, domains in the cloud, etc.) determines the extent to which players at one hybrid game can enter into a side bet with another player.

In some embodiments, multiple players, each competing independently against a computer opponent in the same game type (e.g. Madden Football), can place bets on their relative performance. For example, if three players are each going to play a first person shooter game independently against a computer opponent, they could place a side bet on which player will accumulate the highest level of GWC over the a given period of time or as a function of a specific amount of EE consumption (e.g. the amount of GWC accumulated over the course of firing 250 bullets). If one or more players (reflecting the bet type and the number of players participating head-to-head) accept the bet, then the appropriate amount of currency being bet is deducted from each player. Game play commences (or continues if the side bet was made in the midst of game play), and upon completion of the criteria to bring the bet to closure, the appropriate payments are made to each player and/or the casino.

In numerous embodiments, the use of side bets can be turned on or off, for playability purposes, through the host mode configuration wizard of the hybrid game. In another embodiment, the use of side bets can be turned on or off at any time, through the GW user interface 126.

In various embodiments, the hybrid game 106 can, but need not necessarily, apply a usage fee against the placement of a side bet, such that a percentage of the bet amount, or a fixed fee, is collected from one or all of the participants in the side bet. The usage fee, which is collected by the casino, can be levied locally, at the hybrid game, as a function of the SBM 130 at that machine having initiated the bet or it can be levied by the GBM (not shown).

In numerous embodiments, side bets can be made in the context of RC, GWC, EE, or other elements of the entertainment game (e.g. in an adventure game, a weapon or a potion could be the subject of the bet), that is, any of these RW and GW elements may be used as a currency for the side bet. It is also possible, in the case where elements of the entertainment game are being bet (i.e. not RC, GWC or EE), that the elements committed to the bet can be differentiated from one another, even within the context of a single bet. For example, a first player might bet a set of armor while the second player might commit a crossbow to the same bet. In this example, both players would agree to enter the bet based upon the criteria for winning and the currency to be committed to the proposition (in this case armor on the one hand and a crossbow on the other).

In many embodiments, side bets need not be 1:1 affairs where elements of equivalent value or equivalent perceived value are committed to the proposition. Bets can also be made with associated odds, such that two players betting on whether the next football play in a head-to-head competition of Madden Football is going to be a touchdown could agree that if the play is a touchdown the payout is 10 RC to the player currently on offense, while the payout will only be one RC to the player currently playing defense if the play does not result in a touchdown. In such a case, at the time the bet is made, only one RC is collected by the SBM from the offensive player while ten is collected from the defensive player.

Some embodiments include a display that shows the player the results of his bets against the computer opponent (when not playing head-to-head) or against other players (when competing head-to-head). These results can persist beyond the playing of a single game, and through the player's profile, span multiple game sessions. Likewise, the display can show the status of bets made but not yet fully resolved within a given game session or across multiple sessions.

An example of a head-to-head side bet in the context of a hybrid game implementation of RISK is as follows. This is meant to be illustrative, but not exhaustive in terms of the nature of the invention. During Player 1's turn, he decides to attack Player 2's country. Player 1 believes he will prevail, and invites Player 2 to accept a side bet. Using the hybrid game display Player 1 selects the amount of the side bet—which can be made as a selection from a pre-established range of RC or which can be entered by Player 1 as a variable amount up to and including the amount of RC the player has net of any RC that must be committed as a function of committing to the battle at hand. Having confirmed his desire to place this side bet, player 2 is informed of the bet, and given the opportunity to accept or reject the bet. If the bet is rejected, the game moves on to resolution of Player 1's attack upon Player 2's country and the bet is abandoned. If the bet is accepted the appropriate amount of RC is deducted from each player's account pending resolution of the bet. Then game play resumes, with simulated dice rolls taking place until Player 1 prevails, or Player 1 withdraws or is annihilated. If Player 1 prevails, the appropriate amount of RC is transferred from Player 2 to Player 1. If Player 2 prevails, the opposite occurs. A fee may or may not be charged by the casino for facilitating this bet. If so, that amount is deducted prior to the bet being settled.

An example of a side bet in the context of a non-head-to-head hybrid game implementation of a Scrabble game follows. At the onset of the game, the player is invited to place a side bet on whether he will achieve a score of over 300 points in the game. The hybrid game suggests the threshold for this bet (i.e. 300 points) based upon the player's prior experience playing the game, and the general performance of other players across a large number of sessions across one or a multitude of instances of the Scrabble Hybrid game. The Hybrid game gives the player the opportunity to bet 1,000 GWC from his player account or 5,000 GWC. The player selects 1,000

GWC, confirms the bet, and commences playing the Scrabble game. The 1,000 GWC is removed from the player's account and held by the SBM. At the conclusion of the game the player has a score of 306, and the SBM augments his account is augmented by 2,000 GWC.

An example of a non head-to-head side bet that spans multiple game session follows. A player accesses a patron management system, such as patron management systems 124 and 125, through the hybrid game 106 he is engaged with to invite four of his friends that are with him at the casino to each bet 100 RC as to who will accumulate the most GWC in the game by 6 p.m. that evening. The GBM 130 informs each player of the proposed bet, either through hybrid games at which they are playing and/or through text messages or emails. The four friends individually accept or decline to participate in the bet, and may do so either through a hybrid game, or other communications means, including through a web page, text message, or secure communication, where the GBM has the means to cause each player to commit the currency or player club points necessary to fund the player's bet. When 6 p.m. comes around, the GBM compares the amounts of GWC accumulated, pays out the bet to the account of the winning player and notifies all players (via email, text, display of a hybrid game, etc.) as to the result.

In many embodiments, placement of bets by third parties that are not directly participating in the play of a hybrid game are supported. The GBM 130 can be configured by the casino to provide betting opportunities for non-players to bet, for example, on the action of play in a particular hybrid game session, to bet on the outcome of a head-to-head game being played by two or more players, or to bet on the results of tournament play.

In numerous embodiments a side bet may be made that is a wager placed by a player of a hybrid game in the context of the outcome of interactive game play, where the bet relates either to the outcome of game play, an intermediary event within interactive game play, or both. Side bets can be, for example, made by a player in response to a prompt by the hybrid game, at the initiation of the player, between a single player and the hybrid game, or between players involved in a multi-player game or playing distinct instances of the same game title. This list is exemplary and not meant to be exhaustive.

Figure 2:
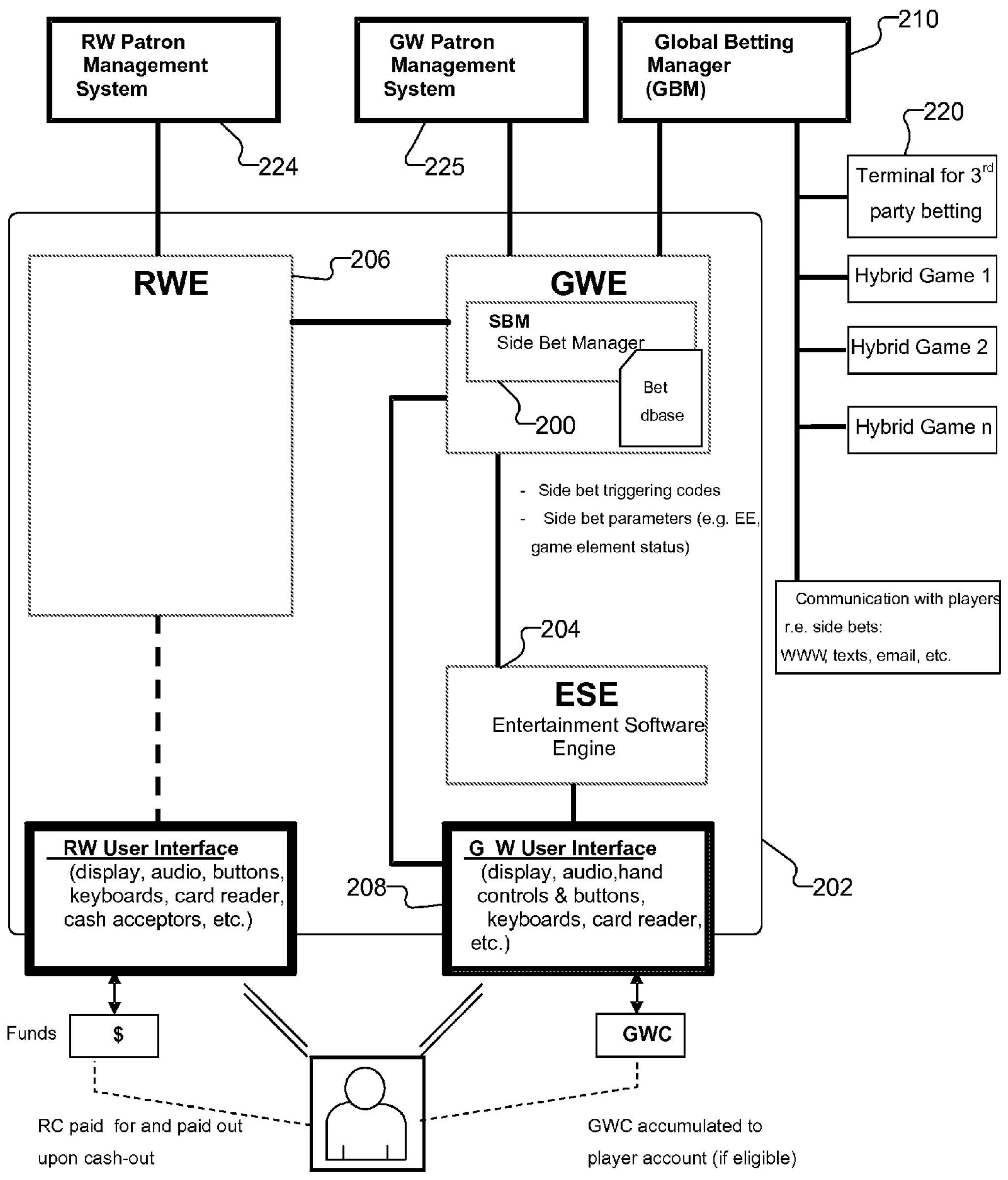
FIG. 2 is a diagram of an exemplary embodiment of a system incorporating a plurality of hybrid games having side betting modules.

FIG. 2 illustrates the interaction between a SBM 200 and the other elements of a hybrid game 202. Resident within the game, the SBM communicates with an ESE 204 to receive information about the state of game variables (necessary to parameterize and close out bets), and also to receive bet trigger codes that can be interpreted directly, or referenced against a side bet database that includes a list of all prospective side bet types supported by the hybrid game being played, along with acceptable ranges for such bets and the types of currency or player club points that can be bet. The SBM 200 communicates back to the ESE 204 reductions or additions to EE or other game parameters (e.g. if the player won a potion in an adventure game) that ultimately need to be reflected in the entertainment game. The SBM 200 also communicates with the RWE 206 to augment or decrement the amount of RC if the side bet involves RC.

In some embodiments, the SBM 200 communicates with the player through a GW user interface 208 to inform the player as to the availability of side bets and to accept input from the player as to the creation, acceptance or rejection of side bets.

In numerous embodiments, the SBM 200 communicates with other SBMs in other hybrid games, such as hybrid game 1, hybrid game 2 and hybrid game 3, either directly, on a peer-to-peer basis, or as shown in FIG. 2, through an overarching GBM 210. The GBM allows side bets to be made between players on different hybrid game machines that may be co-located or that may be connected only through a network, including the Internet. In some embodiments, the GBM can also connect home game consoles, PCs, web browsers and other network interfaces that support game play and the placement of side bets. In many embodiments, the GBM also interfaces with terminals 220 or other interface means that permit third parties to bet on hybrid game side bet propositions in which they are not necessarily active participants. In many embodiments, the GBM further interfaces with one ore more patron management systems 224 and 225 to gain access to player specific information necessary to affect side bets, and to ensure that proper records, on a player-by-player basis are kept regarding side bet activity.

Figure 3:
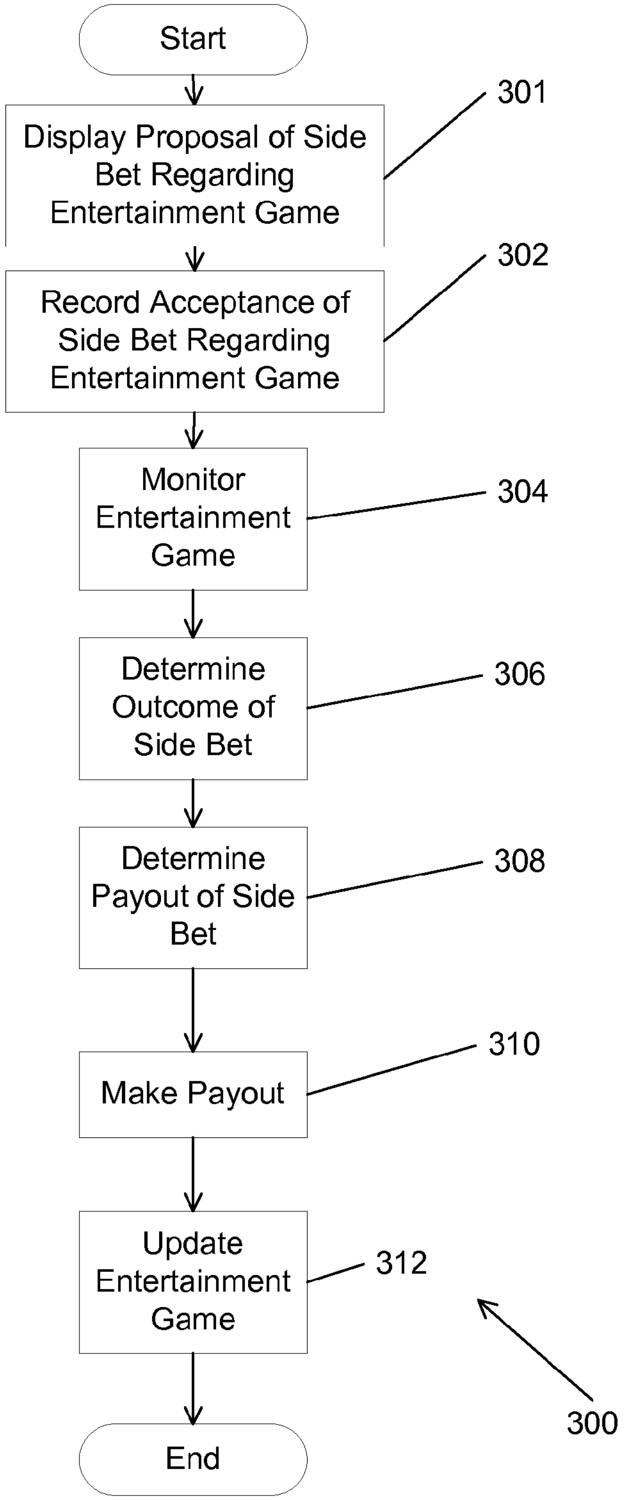
FIG. 3 is a flow diagram of an exemplary embodiment of a side betting process of a hybrid game having a side betting module.

FIG. 3 is a flow diagram of an exemplary embodiment of a side betting process of a hybrid game having a side betting module. The process 300 starts with a hybrid game presenting a proposal (301) of a side bet regarding some aspect of the play of an interactive skill-based entertainment game portion of the hybrid game as previously described. In some embodiments, the proposed side bet can be from a player of a hybrid game and proposed to another player of the hybrid game. In many embodiments, the proposed side bet is made by the hybrid game to the player of the hybrid game. In numerous aspects, the proposed side bet may be between observers of the playing of the hybrid game. The hybrid game then records the acceptance (302) of the side bet in a side bet database. The hybrid game then monitors (304) the play of the entertainment game portion of the hybrid game and determines (306) the outcome of the side bet. The hybrid game then determines (308) the appropriate payout for the side bet. As previously described, a side bet can be made in terms of RC, GWC, EE, any type of GW object, etc. The hybrid game then makes (310) the payout by incrementing and/or decrementing the appropriate currency of the side bet, such as RC, GWC, EE, game objects, etc. The hybrid game then updates (312) the state of the entertainment game portion of the hybrid game to reflect the result of the side bet as previously described.

Figure 4:
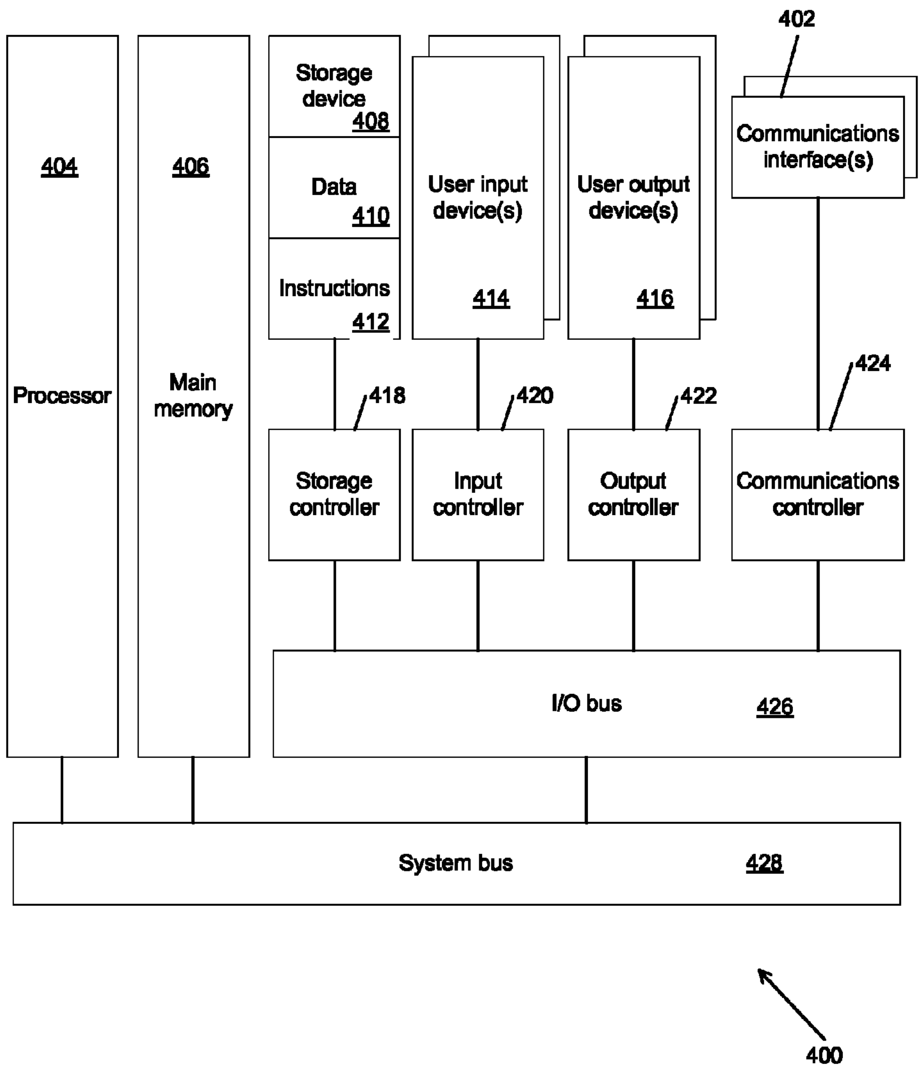
FIG. 4 illustrates a hardware architecture diagram of an exemplary embodiment of a processing apparatus for a hybrid game having a side betting module.

Any of a variety of processing apparatuses can host various components of a hybrid gaming system in accordance with various embodiments of the invention. In several embodiments, these processing apparatuses can include, but are not limited to, a gaming machine, a general purpose computer, a computing device and/or a controller. A processing apparatus in accordance with various embodiments of the invention is illustrated in FIG. 4. In the processing apparatus 400, a processor 404 is coupled to a memory 406 by a bus 428. The processor 404 is also coupled to non-transitory processor-readable storage media, such as a storage device 408 that stores processor-executable instructions 412 and data 410 through the system bus 428 to an I/O bus 426 through a storage controller 418. The processor 404 is also coupled to one or more interfaces that may be used to connect the processor to other processing apparatuses as well as networks as described herein. The processor 404 is also coupled via the bus to user input devices 414, such as tactile devices like keyboards, keypads, foot pads, touch screens, trackballs, etc., as well as non-contact devices such as audio input devices, motion sensors and motion capture devices, etc. that the processing apparatus may use to receive inputs from a user when the user interacts with the processing apparatus. The processor 404 is connected to these user input devices 414 through the system bus 428, to the I/O bus 426 and through the input controller 420. The processor 404 is also coupled via the bus to user output devices 416 such as (but not limited to) visual output devices, audio output devices, and/or tactile output devices that the processing apparatus uses to generate outputs perceivable by the user when the user interacts with the processing apparatus. In several embodiments, the processor is coupled to visual output devices such as (but not limited to) display screens, light panels, and/or lighted displays. In a number of embodiments, the processor is coupled to audio output devices such as (but not limited to) speakers, and/or sound amplifiers. In many embodiments, the processor is coupled to tactile output devices like vibrators, and/or manipulators. The processor is connected to output devices from the system bus 428 to the I/O bus 426 and through the output controller 422. The processor 404 can also be connected to a communications interface 402 from the system bus 428 to the I/O bus 426 through a communications controller 424.

In various embodiments, a processor loads the instructions and the data from the storage device into the memory and executes the instructions and operates on the data to implement the various aspects and features of the components of a gaming system as described herein. The processor uses the user input devices and the user output devices in accordance with the instructions and the data in order to create and operate user interfaces for players, casino operators, owners, etc. as described herein.

Although the processing apparatus is described herein as being constructed from a processor and instructions stored and executed by hardware components, the processing apparatus can be composed of only hardware components in accordance with many embodiments. In addition, although the storage device is described as being coupled to the processor through a bus, those skilled in the art of processing apparatuses will understand that the storage device can include removable media such as a USB memory device, an optical CD ROM, magnetic media such as tape or disks, etc. Also, the storage device can be accessed through one of the interfaces or over a network. Furthermore, any of the user input devices or user output devices can be coupled to the processor via one of the interfaces or over a network. In addition, although a single processor is described, those skilled in the art will understand that the processor can be a controller or other computing device or a separate computer as well as be composed of multiple processors or computing devices.

In numerous embodiments, any of an SBM, GBM, an RWE, a GWE and an ESE as described herein can be implemented on one or more processing apparatuses, whether dedicated, shared or distributed in any combination thereof, or may be implemented on a single processing apparatus. In addition, while certain aspects and features of a gaming and regulatory monitoring system described herein have been attributed to a SGM, a GBM, an RWE, a GWE or an ESE, these aspects and features may be implemented in a hybrid form where any of the features or aspects may be performed by any of a SGM, a GBM, an RWE, a GWE or an ESE within a gaming system without deviating from the spirit of the invention.

While the above description contains many specific embodiments of the invention, these should not be construed as limitations on the scope of the invention, but rather as an example of one embodiment thereof. It is therefore to be understood that the invention may be practiced otherwise than as specifically described, without departing from the scope and spirit of the invention. Thus, embodiments of the invention should be considered in all respects as illustrative and not restrictive.

What is claimed:

1. A method of processing a side bet in a hybrid game having an entertainment game portion and a gambling game portion, the method comprising:

accepting by the hybrid game from a player of the hybrid game, real world credits to be wagered in the gambling game portion of the hybrid game;

presenting by the hybrid game to the player, a proposal of an entertainment game enabling element side bet regarding the entertainment game portion of the hybrid game;

monitoring by the hybrid game a player action of consuming the enabling element during the player's playing of the entertainment game portion of the hybrid game;

triggering by the hybrid game a wager of the real world credits in the gambling game portion of the hybrid game based on the monitoring of the player action of consuming the enabling element during the player's playing of the entertainment game portion of the hybrid game;

determining by the hybrid game an entertainment game enabling element outcome of the entertainment game enabling element side bet based on the monitoring of the player action of consuming the enabling element during the player's playing of the entertainment game portion of the hybrid game;

determining by the hybrid game a real world credit outcome of the wager of the real world credits by executing the wager of the real world credits in the gambling game portion of the hybrid game;

making by the hybrid game a payout of an amount of real world credits in the gambling game portion of the hybrid game based on the real world credit outcome of the wager in the gambling game portion of the hybrid game; and updating by the hybrid game a state of the entertainment game based on the outcome of the entertainment game enabling element side bet.

2. The method of claim 1, wherein the entertainment game enabling element side bet is between a player of the hybrid game and the hybrid game.

3. The method of claim 1, wherein the entertainment game enabling element side bet is between two players of the hybrid game.

4. The method of claim 1, wherein the entertainment game enabling element side bet is between two observers of the playing of the hybrid game.

5. A data processing apparatus for a hybrid game including processing a side bet in a hybrid game having an entertainment game portion and a gambling game portion, the apparatus comprising:

a processor;

a memory coupled to the processor, the memory having processor-executable instructions stored thereon, the processor-executable instructions comprising:

accepting by the hybrid game from a player of the hybrid game, real world credits to be wagered in the gambling game portion of the hybrid game;

presenting by the hybrid game to the player, a proposal of an entertainment game enabling element side betregarding the entertainment game portion of the hybrid game;

monitoring by the hybrid game a player action of consuming the enabling element during the player's playing of the entertainment game portion of the hybrid game;

triggering by the hybrid game a real world credit wager in the gambling game portion of the hybrid game based on the monitoring of the player action of consuming the enabling element during the player's playing of the entertainment game portion of the hybrid game;

determining by the hybrid game an entertainment game enabling element outcome of the entertainment game enabling element side bet based on the monitoring of the player action of consuming the enabling element during the player's playing of the entertainment game portion of the hybrid game;

determining by the hybrid game a real world credit outcome of the real world credit wager by executing the real world credit wager in the gambling game portion of the hybrid game;

making by the hybrid game a payout of an amount of real world credits in the gambling game portion of the hybrid game based on the real world credit outcome of the wager in the gambling game portion of the hybrid game; and updating by the hybrid game a state of the entertainment game based on the outcome of the entertainment game enabling element side bet.

6. The apparatus of claim 5, wherein the entertainment game enabling element side bet is between a player of the hybrid game and the hybrid game.

7. The apparatus of claim 5, wherein the entertainment game enabling element side bet is between two players of the hybrid game.

8. The apparatus of claim 5, wherein the entertainment game enabling element side bet is between two observers of the playing of the hybrid game.

9. A non-transitory processor-readable storage medium storing processor-executable instructions for a method of processing a side bet in a hybrid game having an entertainment game portion and a gambling game portion, the instructions comprising:

accepting by the hybrid game from a player of the hybrid game, real world credits to be wagered in the gambling game portion of the hybrid game;

presenting by the hybrid game to the player, a proposal of an entertainment game enabling element side bet-regarding the entertainment game portion of the hybrid game;

monitoring by the hybrid game a player action of consuming the enabling element during the player's playing of the entertainment game portion of the hybrid game;

triggering by the hybrid game a real world credit wager in the gambling game portion of the hybrid game based on the monitoring of the player action of consuming the enabling element during the player's playing of the entertainment game portion of the hybrid game;

determining by the hybrid game an entertainment game enabling element outcome of the entertainment game enabling element side bet based on the monitoring of the player action of consuming the enabling element during the player's playing of the entertainment game portion of the hybrid game;

determining by the hybrid game a real world credit outcome of the real world credit wager by executing the real world credit wager in the gambling game portion of the hybrid game;

making by the hybrid game a payout of an amount of real world credits in the gambling game portion of the hybrid game based on the real world credit outcome of the wager in the gambling game portion of the hybrid game; and updating by the hybrid game a state of the entertainment game based on the outcome of the entertainment game enabling element side bet.

10. The non-transitory processor-readable storage medium of claim 9, wherein the entertainment game enabling element side bet is between a player of the hybrid game and the hybrid game.

11. The non-transitory processor-readable storage medium of claim 9, wherein the entertainment game enabling element side bet is between two players of the hybrid game.

12. The non-transitory processor-readable storage medium of claim 9, wherein the entertainment game enabling element side bet is between two observers of the playing of the hybrid game.

* * * * *